2,796,363
COATING COOKING VESSELS AND METHOD OF COATING

Murray J. Lalone, Cresskill, N. J.

No Drawing. Application July 31, 1950,
Serial No. 176,916

9 Claims. (Cl. 117—167)

This invention relates to compositions of matter for coating cooking utensils prior to the cooking process and also to a novel method for applying said compositions to such vessels.

Objects and advantages of the invention will be set forth in part hereinafter and in part will be obvious herefrom, or may be learned by practice with the invention, the same being realized and attained by means of the compositions, steps and combinations pointed out in the appended claims.

The invention consists in the novel compositions, steps, processes, combinations and improvements herein described.

The invention is directed to providing a novel composition of matter which can be quickly, uniformly and effectively applied to the surface of frying pans, sauce pans, baking tins and similar vessels for cooking, whether made of metal, of glass, or ceramic materials, to facilitate cleaning of the vessels after use. By application of the novel composition provided by the invention, used cooking vessels can be readily cleaned without scouring or the use of detergents, the particles of food remaining thereon being readily removed by a light brushing or soaking with water.

Another object of the invention is to provide such a composition for cooking vessels which will permit the cooking of many foods without fat or grease or with a relatively very small quantity thereof—in effect a substantially greaseless cooking in frying operations.

While prior efforts have been made to provide compositions for the same general purposes, such compositions have been relatively ineffective or have involved the use of very expensive ingredients. The present invention provides an inexpensive composition for the purposes indicated which is tasteless and non-toxic and, by virtue of the novel method of application thereof, can be applied in very thin and uniform films to surfaces so that a minor quantity is required for a single application, which can be readily reapplied when needed.

In general the invention comprises a composition in which lecithin is a primary ingredient, providing the essential component of the surface film. Lecithin not only has the desired surface and spreading effects on metal and ceramic vessels but, being essentially a food product itself, it possesses the very desirable qualities of being tasteless, odorless and non-toxic, as well as combining well with other ingredients used to form the preferred composition of the invention. By the term "lecithin" I refer to the commercial form thereof obtained from various natural sources, principally soya bean oil. Chemically it is principally a mixture of lecithin and cephalin, both of which are phosphatides.

While lecithin is usable alone for the purpose indicated, the application thereof to cooking surfaces can be greatly facilitated by the combination therewith of one or more vegetable oils, in the quantities hereinafter specified. Such oils, which may be hydrogenated, including corn oil, cotton seed oil, peanut oil, olive oil, soybean oil and other refined vegetable oils, when mixed with lecithin, tend to reduce the viscosity thereof and facilitate the application and "wetting" action thereof on cooking vessel surfaces. The quantity of such oils to be combined with lecithin should be not more than 90% of the combination and may range from there down to zero, in the case where lecithin alone is used.

Further, in accordance with the invention, I preferably apply the lecithin or combination of lecithin and vegetable oil to the cooking surfaces of vessels in the form of a very fine spray under substantial pressure. By this method of application, a very thin film of the composition may be applied uniformly and very rapidly. For example, with a composition made in accordance with the invention, a suitable film of the lecithin-oil combination can be sprayed on the surface of a pan in as short a time as five seconds. For the purpose of spraying the composition as stated, it is preferable that it be dissolved or mixed or dispersed in a suitable fluid vehicle which can act as a volatile propellant, expelling the composition from a can or other pressure "spray bomb" vessel, according to present well-known practices (as in the disinfectant bombs now in common use). For this purpose it is necessary to have a propellant vehicle which is rather highly volatile at room temperatures and pressures so that it will be immediately dissipated upon spraying, leaving the lecithin-oil film deposited solidly on the cooking surface. Such propellant fluid must also be non-toxic and preferably odorless and tasteless as well.

For purposes of the invention I have found that a suitable propellant is the substance having the trade name "Genetron" 102J which is a non-flammable, non-toxic mixture of aliphatic fluoro-halo compounds.

This substance has a vapor pressure of 38 lbs. per sq. in. at 70° F. so that it acts as a relatively low pressure propellant from a can or other suitable "bomb" vessel, but volatilizes and is rapidly dissipated upon application. Other similar propellant fluids may be used, such as "Freon" which is understood to be a fluoro-halo derivative, or a mixture of fluoro-halo derivatives of low molecular weight hydrocarbons, non-flammable and non-toxic.

While the coating composition can be effectively propelled and sprayed in various quantities of the vehicle, I have found it preferable to keep the proportion of the propellant relatively high with respect to the coating composition, as otherwise globules thereof tend to segregate and be dispersed as such, whereas with the higher proportions of the propellant, the coating composition is propelled or sprayed in a fine mist free from globules. Thus while up to 25% of the coating composition may be dispersed in 75% of the propellant fluid, I have found that the optimum range is between 5% and 1% of the coating composition in the propellant fluid, with a preferred proportion being about 2.5% of the composition in 97.5% of the propellant fluid. To prevent formation of corrosive acids in the container, I may use the anhydrous form of lecithin in the propellant, although the amount of water contained in the commercial form is usually insufficient to be objectionable.

A preferred composition embodying the invention is a mixture of 50% of anhydrous lecithin and 50% corn oil, 2.5% of said mixture being dispersed in 97.5% of the "Genetron" propellant and packed under pressure in a can with a release valve and spraying nozzle, such as is used in the well-known "Aerosol" bomb. When such a composition is sprayed on a surface of a cooking vessel for say five seconds, an exceedingly thin, uniform film of the coating composition is formed which tends to adhere strongly to the surface of the vessel and, in the case of metal surfaces, appears to have some chemical combination therewith. Such a very thin film of the coating composition will permit the cooking of moisture-containing material such as eggs, pancakes, etc., without any grease or fat and, after cooking, these materials will come free from the surface without scrubbing or scouring. When fatty foods are cooked on a surface so coated, they will come off readily by soaking in water for a few minutes, even when burned crisp or charred. In no case is scrubbing, scouring or the use of brushes, abrasives or scouring powders, soaps or detergents required for cleaning.

While preferably the composition should be applied each time the vessel is used, in many cases it will last for two or three cookings without re-application.

It should be particularly noted that the coating composition of the invention does not require to be heated in order to perform its functions, but forms a rugged greaseless surface on the cooking vessel as soon as it is applied by spraying or otherwise.

The composition can also be sprayed by other means, such as squeezing from a compressible plastic bottle of polyethylene.

While spraying is a greatly preferred method of application because of simplicity, rapidity and uniformity, it is possible to apply the composition manually, without spraying and without the propellant vehicle. Also absorbent pads or daubers or paper may be impregnated with the composition for manual application. Even 100% lecithin can be successfully employed, provided it is spread onto a pre-warmed surface, the higher temperature reducing the viscosity of the lecithin sufficiently for that purpose.

While lecithin in proportions of at least 10% constitutes the preferred ingredient of my coating composition, I have also discovered that certain other compounds may be essential equivalents of lecithin in this connection. For example, certain of the fatty acid esters may be used in lieu of lecithin, that is those which constitute edible detergents, as for example, glyceryl monostearate. Another such substance which can be used as the equivalent of lecithin is "Myverol," a product sold by Distillation Products Inc. and constituting a highly purified vacuum distilled glyceryl monostearate. Other fatty acid esters which may be used are glyceryl mono laurate, glyceryl mono oleate, and glyceryl oleostearate. Certain glycol fatty acid esters may be used, such as diethylene glycol stearate, propylene glycol monolaurate, and propylene glycol monostearate; also polyethylene glycol fatty acid esters, such as polyethylene glycol monostearate.

The invention in its broader aspects is not limited to the specific compositions, processes and steps shown and described but departures may be made therefrom within the scope of the accompanying claims without departing from the principles of the invention and without sacrificing its chief advantages.

What I claim is:

1. A cooking implement having a cooking surface consisting of a thin coating comprising at least 10% lecithin.

2. A cooking implement having a cooking surface consisting of a thin coating of a vegetable oil containing at least 10% of lecithin mixed at substantially normal temperature.

3. A cooking implement as defined in claim 2 wherein the coating comprises a vegetable oil containing a substantially equal amount of lecithin intermixed and unreacted therewith.

4. A method for providing a cooking implement which can be readily cleaned without scouring or the use of detergents and which permits a substantially greaseless cooking in frying operations, comprising, applying to the cooking surfaces of the implement a coating composition comprising at least 10% lecithin.

5. A method as defined in claim 4 wherein the coating composition consists of a vegetable oil containing at least 10% lecithin mixed at substantially normal temperatures.

6. A method as defined in claim 4 wherein the coating comprises a vegetable oil containing a substantial equal amount of lecithin intermixed and unreacted therewith.

7. A method for providing a cooking implement which can be readily cleaned without scouring or the use of detergents and which permits a substantially greaseless cooking in frying operations, comprising, applying to the cooking surfaces of the implement by means of spraying a composition comprising 1 to 5% of lecithin dispersed in a volatile, non toxic propellant fluid.

8. A method as defined in claim 7 wherein the sprayed composition also contains a vegetable oil mixed with and unreacted with the lecithin, said mixture comprising less than 25% of the total spray composition.

9. A method as defined in claim 7 wherein the lecithin comprises at least 10% of said mixture.

References Cited in the file of this patent

UNITED STATES PATENTS

| | | |
|---|---|---|
| 1,800,156 | Rotheim | Apr. 7, 1931 |
| 1,892,750 | Rotheim | Jan. 3, 1933 |
| 2,070,167 | Iddings | Feb. 9, 1937 |
| 2,198,212 | Musher | Apr. 23, 1940 |
| 2,210,043 | Scherr | Aug. 6, 1940 |
| 2,314,365 | Musher | Mar. 23, 1943 |
| 2,402,690 | Stanley | June 25, 1946 |
| 2,518,290 | Curtis | Aug. 8, 1950 |
| 2,524,590 | Boe | Oct. 3, 1950 |